United States Patent [19]

Nakamura

[11] Patent Number: 4,812,933
[45] Date of Patent: Mar. 14, 1989

[54] MAGNETIC DISC RECORDING AND REPRODUCING DEVICE

[75] Inventor: Shuichi Nakamura, Tokyo, Japan
[73] Assignee: Tokico Ltd., Kanagawa, Japan
[21] Appl. No.: 124,956
[22] Filed: Nov. 18, 1987
[30] Foreign Application Priority Data Nov. 20, 1986 [JP] Japan .................. 61-178419[U]

[51] Int. Cl.⁴ .................. G11B 5/54; G11B 21/22
[52] U.S. Cl. .................................................. 360/105
[58] Field of Search .................................. 360/105, 75

[56] References Cited

U.S. PATENT DOCUMENTS

| | | | |
|---|---|---|---|
| 4,139,874 | 2/1979 | Shiraishi | 360/105 |
| 4,686,595 | 8/1987 | Bryer | 360/105 |
| 4,706,142 | 11/1987 | Hattori et al. | 360/105 |
| 4,742,410 | 5/1988 | Smith | 360/105 |
| 4,751,595 | 6/1988 | Kishi et al. | 360/105 |

*Primary Examiner*—Robert S. Tupper
*Attorney, Agent, or Firm*—Wenderoth, Lind & Ponack

[57] ABSTRACT

A magnetic disc recording and reproducing device of the type having floating type magnetic head adapted to be displaced by a drive motor, said device comprising a magnetic head automatic returning means including a pinion mounted on a shaft of the drive motor for rotation in correspondence with the displacement of the head, a magnetic head returning member disposed rotatably and adapted to disengage from the pinion at the end of a "return to zero" motion of the drive motor and engage with the pinion when the drive motor is stopped, a spring for biasing the magnetic head returning member in the direction of tending to engage with the pinion, and a lock mechanism for holding the magnetic head returning member in the condition of disengagement from the pinion at and after the end of the "return to zero" motion and for permitting the magnetic head returning member to rotate when the drive motor is stopped.

1 Claim, 2 Drawing Sheets

MAGNETIC DISC RECORDING AND REPRODUCING DEVICE

BACKGROUND OF THE INVENTION

This invention relates to a floating type magnetic head auto-return means for a magnetic disc recording and reproducing device.

Conventionally, in a magnetic disc recording and reproducing device including a floating type magnetic head, the magnetic head is adapted to be floated a microscopic distance above the disc surface of a magnetic disc by virtue of an air flow which is generated on the disc surface by the rotation of the magnetic disc, thus allowing the magnetic head to effect reading/writing of information on the magnetic disc. When the reading/writing operation has finished, the rotation of the magnetic disc is stopped and the magnetic head that has been floating descends and comes into contact with the disc surface at a suitable position.

In the prior art described above, the magnetic head is in contact with the disc surface of the magnetic disc when the magnetic disc recording and reproducing device is not in operation. In the moments of starting and stopping rotation of the magnetic disc, therefore, the magnetic disc rotates with the magnetic head in contact therewith and, due to this, there is some apprehension that the disc surface many be damaged and that the recorded information may disappear. There is also some apprehension that the disc surface may be damaged due to the vibration that will occur when the device is transported. There is a further drawback in the prior art also. Namely, the magnetic head may stick to the disc surface when the magnetic disc is at a stop due to the presence of lubricant (normally, fluoric oil) applied on the disc surface, and if the magnetic disc starts to rotate in this condition, the disc surface of the magnetic disc will suffer damage.

SUMMARY OF THE INVENTION

The present invention has been accomplished in view of the drawbacks of the prior art mentioned above and an object of the present invention is to ensure without fail that the disc surface is prevented from being damaged and the recorded information is prevented from disappearing by automatically displacing the magnetic head onto a non-recording area on the disc surface of the magnetic disc where the recording of information is inhibited whenever the magnetic disc recording and reproducing device is not in operation.

In order to accomplish the above-mentioned object, the present invention provides a magnetic disc recording and reproducing device of the type having a magnetic head adapted to be floated above the disc surface of a magnetic disc in response to the rotation of the magnetic disc and to be displaced in the direction of the radius of the magnetic disc by a drive motor, the device comprising a magnetic head automatic return means including a pinion fixedly mounted on a drive shaft of the drive motor for rotation through a predetermined angle in correspondence to the reciprocation of the magnetic head, a magnetic head returning member rotatably disposed and adapted to become disengaged from the pinion at the end of a "return to zero" motion of the drive motor and become engaged with the pinion when the drive motor is stopped so as to forcibly rotate the pinion, thereby returning the magnetic head to a predetermined position, a biasing spring for biasing the magnetic head returning member in the direction of tending to engage with the pinion, and a lock mechanism for holding the magnetic head returning member in the condition of disengagement from the pinion against the spring force of the biasing spring at and after the end of the "return to zero" motion of the drive motor and for permitting the magnetic head returning member to rotate when the drive motor is stopped.

BRIEF DESCRIPTION OF THE DRAWINGS

Further objects of the present invention will become apparent from the following description of a preferred embodiment of the invention exemplified in the accompanying drawings and will be indicated in the appended claims, while various advantages not referred to herein will occur to those skilled in the art upon employment of the invention in practice.

DETAILED DESCRIPTION OF A PREFERRED EMBODIMENT

Figure 1:
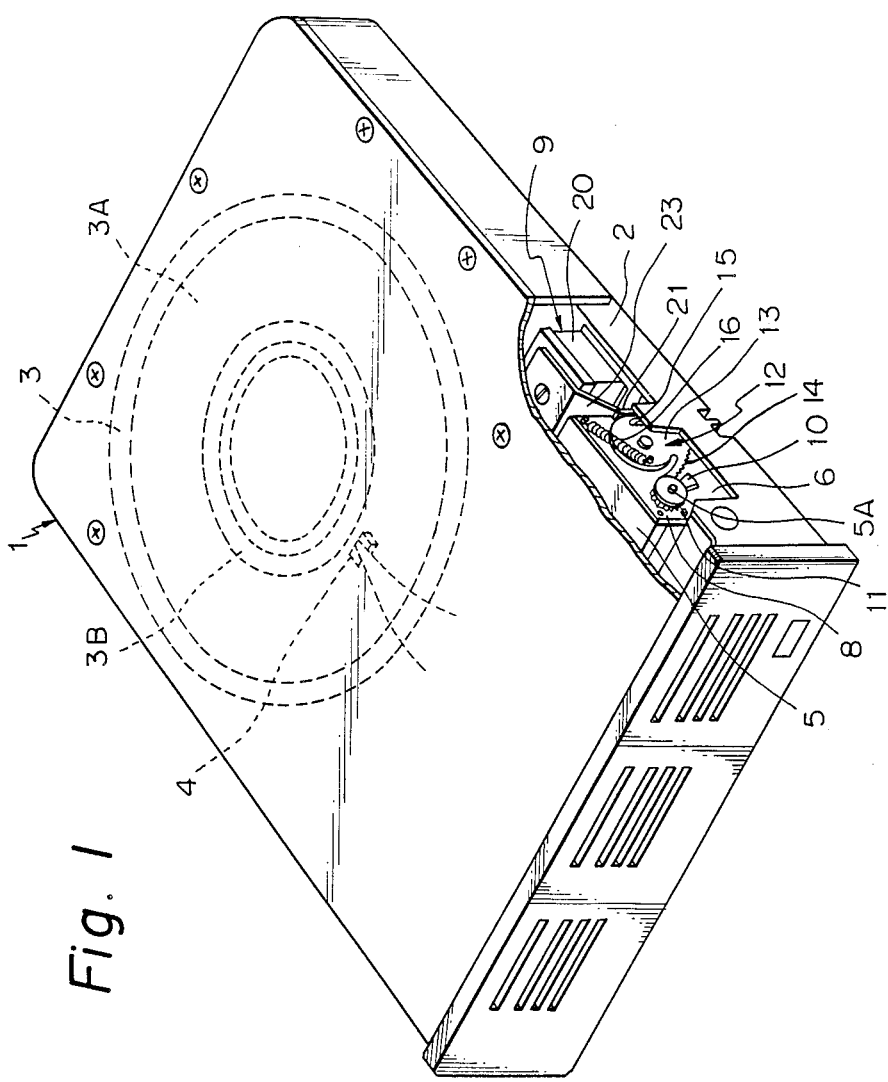
FIG. 1 is a partially broken-away perspective view of a magnetic disc recording and reproducing device provided with a magnetic head automatic returning means according to a preferred embodiment of the present invention.

Referring to the drawings, a preferred embodiment of the invention will be explained in detail.

Shown at 1 in FIG. 1 is a magnetic disc recording and reproducing device according to a preferred embodiment of the invention which includes a casing 2 with sealed structure for sealing the interior thereof and preventing dust from penetrating to the interior thereof. A magnetic disc 3 is disposed within the casing 2 and is fixedly mounted on a rotating shaft of a spindle motor (both not shown). On the disc surface of the magnetic disc 3 are formed an information recording area 3A and a landing area 3B located inside the recording area 3A. On the landing area 3B no information is written. Reference numeral 4 denotes a floating type magnetic head adapted to float above the magnetic disc 3 in response to the rotation of the disc 3 for writing information on the information recording area 3A and reading information recorded on the information recording area 3A. A stepping motor 5 is disposed within the casing as a drive motor for reciprocating the magnetic head in the direction of the radius of the magnetic disc 3 through a magnetic head displacing mechanism (not shown). A mounting bracket 6 is fixedly attached onto an outer side surface of the stepping motor 5 by means of a plurality of screws 7. The mounting bracket 6 is made of an elongated plate and formed with a step at an intermediate position in the longitudinal direction.

Figure 4:
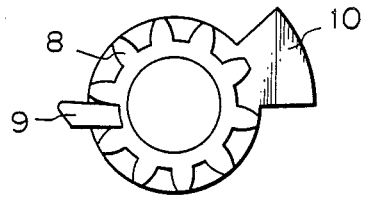
FIG. 4 is a rear elevation of the pinion.

A drive shaft 5A of the drive motor 5 passes through the mounting bracket 6 and projects to the outside of the casing 2. A pinion 8 is fixedly mounted on the drive shaft 5A and rotates a predetermined angle in the directions of arrows A and B in correspondence with the reciprocation of the magnetic head 4 when the magnetic head 4 is displaced in the direction of the radius of the magnetic disc. In the embodiment, the pinion 8 has ten teeth. The pinion may, however, have eleven or more teeth so as to be able to effect even finer positioning. As shown in FIG. 4, the pinion 8 is provided with a pushing member 9 that projects radially and is adapted to push an arcuate toothed portion 14 of a magnetic head returning member 12 as described hereinafter. Shown at 10 is a sector-shaped stop member formed integrally with the pinion 8 and projecting radially from the outer periphery of the pinion 8. When the magnetic head 4 is positioned on the landing area 3B of the magnetic disc 3, the stop member 10 engages with a stop 11 projecting from the mounting bracket 6 and in association therewith prevents over-rotation of the pinion 8 in the direction of arrow B.

The magnetic head returning member 12 is rotatably mounted on the mounting bracket 6 for rotation in the directions of arrow C and D. The magnetic head returning member 12 includes a generally circular, planar plate-like body portion 13, the arcuate toothed portion 14 radially extending from the outer periphery of the body portion 13 and being adapted to engage with the pinion 8 and a lock pin engaging slot 15 located opposite the arcuate toothed portion 14 in the radial direction of the body portion 13. The lock pin engaging slot 15 includes an arcuate escape slot portion 15A in which a lock pin 22 is adapted to slidably engage, as described hereinafter, and a locking slot portion 15B located at the clockwise end of the escape slot portion 15A and formed integrally with the escape slot portion 15A on the outer periphery side thereof. The arcuate length of the arcuate toothed portion 14 of the magnetic head returning member 12 is of such a size that the toothed portion 14 is able to continue to engage with the pinion 8 during the period between the time when one end 14A of the toothed portion 14 starts to engage with the pinion 8, with the magnetic head 4 located on the outer-most track in the information recording area 3A of the magnetic disc 3, in other words, the time when the one end 14A starts to engage with the pinion 8 that has at that time rotated to its greatest extent in the direction of arrow A, and the time when the magnetic head 4 is displaced to the landing area 3B and the stop member 10 engages with the stop 11 on the mounting bracket 6. Namely, the arcuate length of the toothed portion 14 is sufficient to continue to engage with the pinion 8 during the longest period of displacement of the magnetic head 4. Whenever the magnetic head 4 is positioned on the landing area 3B, the arcuate toothed portion 14 is in engagement with the pinion 8.

Reference numeral 16 denotes a spring for constantly biasing the magnetic head returning member 12 in the direction of arrow C in which it tends to engage with the pinion 8. The spring 16 is a tension type coil spring with one end thereof being hooked over a pin 17 standing on the mounting bracket 6 and the other end thereof being hooked over another pin 18 projecting from the body portion 13 of the magnetic head returning member 12 adjacent the outer periphery thereof.

Shown at 19 is a lock mechanism for keeping the magnetic head returning member 12 disengaged from the pinion 8 against the spring force of the spring 16. The lock mechanism includes a solenoid 20 adapted to be energized and to move a movable metal piece 20A in the direction of arrow E when the electric source of the stepping motor 5 is turned to ON, a lock pin 22 mounted on a mounting arm 21 fixedly attached on the projecting end of the movable metal piece 20A and adapted to fit in the lock pin engaging slot 15, and a returning spring 23 in the shape of a leaf spring with a base end portion that is fixedly attached to the solenoid 20 and a free end portion engaged with the mounting arm 21, thereby pushing the mounting arm 21 in the direction of arrow F when the solenoid is de-energized.

The operation of the magnetic disc recording and reproducing device according to the present invention will now be explained.

Figure 2:
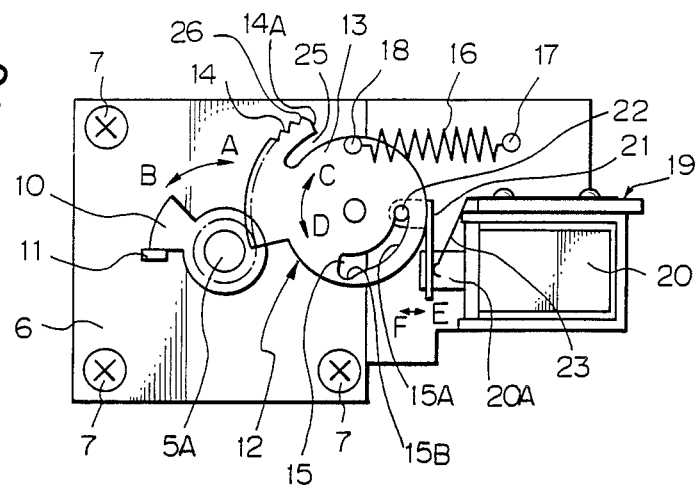
FIG. 2 is a front view of the magnetic head automatic returning means showing the condition in which a magnetic head is returned to a predetermined position on a magnetic disc.

In the preferred embodiment, as described hereinafter, the magnetic head is positioned on the landing area 3B of the magnetic disc 3 whenever the magnetic disc recording and reproducing derive 1 is not in operation. In that condition, as shown in FIG. 2, the pinion 8 is in engagement with the arcuate toothed portion 14 of the magnetic head returning member 12 and the stop member 10 is in engagement with the stop 11 on the mounting bracket 6. The solenoid 20 is de-energized and the lock pin 22 is fitted in the escape slot portion 15A of the lock pin engaging slot 15.

When the electric source of the device is turned to ON, the spindle motor, and thus the magnetic disc 3 start to rotate. In the preferred embodiment, the normal speed of the magnetic disc is 3600 rpm and it takes about 50 ms to reach this normal speed. When the revolutional speed of the magnetic disc 3 reaches the normal speed, the magnetic head 4 is caused to float above the magnetic disc 3 due to the air flow generated by the rotation of the magnetic disc 3 and is displaced to the outer periphery portion of the magnetic disc 3, namely to the information recording area 3A, through the magnetic head displacing mechanism which is driven by the stepping motor 5.

As described above, when the revolutional speed of the magnetic disc 3 reaches the normal speed, the stepping motor 5 starts to rotate and the magnetic head 4 is displaced toward the outer periphery portion, namely toward "zero-track". This movement to the "zero-track" is referred to as a "return to zero" motion. During this "return to zero" motion, the pinion 8 rotates in the direction of arrow A together with the drive shaft 5A of the stepping motor 5, and thus the magnetic head returning member 12 is rotated in the direction of arrow D against the spring force of the tension spring 16 due to the engagement of the arcuate toothed portion 14 with the pinion 8. On the other hand, the solenoid 20 is energized and the movable metal piece 20A is biased in the direction of arrow E against the spring force of the leaf spring 23. Therefore, the magnetic head returning member 12 rotates with the lock pin 22 sliding along the outer wall surface of the escape slot portion 15A of the lock pin engaging slot 15.

Next, when the drive shaft 5A is rotated to maximum in the direction of arrow A and the magnetic head 4 is displaced to the outer-most peripheral portion and reaches the zero-track, the pinion 8 at this point disengages from the arcuate toothed portion 14 of the magnetic head returning member 12. At this time, the pushing member 9 on the pinion 8 pushes the one end 14A of the arcuate toothed portion 14 slightly in the direction of arrow D, and thus the arcuate toothed portion 14 separates from the pinion 8 completely. Simultaneously, the lock pin 22 fits into the locking slot portion 15B of the lock pin engaging slot and the magnetic head returning member 12 is locked in the position shown in FIG. 3 by the locking mechansim 19. Thus, the magnetic head returning member 12 is held in a condition of disengagement from the pinion, and the drive shaft 5A of the stepping motor 5 can, therefore, freely rotate in the directions of arrows A and B, whereby the magnetic head 4 is able to reciprocate through the information recording area to effect writing and reading of the information.

Figure 3:
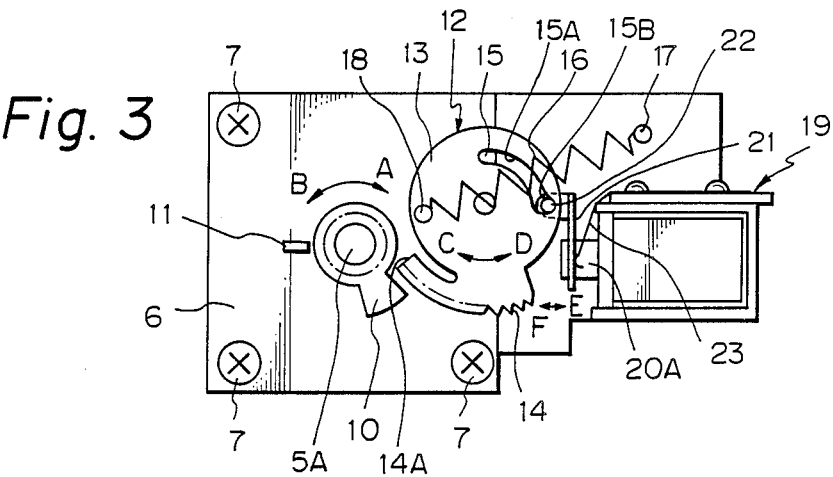
FIG. 3 is similar to FIG. 2 but showing the condition in which a magnetic head returning member is disengaged from a pinion.

Next, when the electric source of the magnetic disc recording and reproducing device is turned to OFF, the stepping motor 5 is stopped and the solenoid is also de-energized. Since the mounting arm 21 is pushed in the direction of arrow F by the spring force of the leaf spring 23, the lock pin disengages from the locking slot 15B of the lock pin engaging slot 15. Thus, the magnetic head returning member 12 is rotated in the direction of arrow C by the spring force of the tension spring 16 and the arcuate toothed portion 14 engages again with the pinion 8 to forcibly rotate it in the direction of arrow B. When the pinion 8 is rotated to its maximum in the direction of arrow B and the magnetic head 4 is positioned on the landing area 3B of the magnetic disc 3, the stop member 10 rotating in common with the pinion 8 engages with the stop 11 and cooperates therewith to prevent the pinion 8 from being over-rotated by the spring force of the tension spring 16 and to stop the magnetic head in a predetermined position. As shown in FIGS. 2 and 3, the magnetic head returning member 12 is provided with a slot 25 defined between the body portion 13 and the arcuate toothed portion 14 and opened on the side of the one end 14A of the arcuate toothed portion 14. Therefore, if the thread 26 near the one end 14A on the arcuate toothed portion 14 collides with a thread on the pinion 8 at the beginning of the engagement of the arcuate toothed portion 14 with the pinion 8 during the rotation of the magnetic head returning member 12 in the direction of arrow C, the one end 14A of the arcuate toothed portion 14 is bent toward the body portion 13 and the arcuate toothed portion 14 begins smooth engagement with the pinion 8.

In the explanation of the operation described above, it was assumed that the magnetic head 4 was positioned on the outer-most track (zero-track) of the magnetic disk 3 when the electric source of the device 1 was turned to OFF. Wherever the magnetic head 4 is positioned, however, in the direction of the radius of the magnetic disc 3, the pinion 8 and the magnetic head returning member 12 engage with each other in a manner similar to that described hereinbefore when the electric source is turned to OFF. In this case, even if the pinion 8 rotates to its maximum in the direction of arrow B and the stop member 10 abuts against the stop 11, the magnetic head returning member 12 cannot return to the position shown in FIG. 1.

In the embodiment described above, the lock mechanism 19 includes a leaf spring as a returning spring 23. However, it is possible to employ a compression coil spring which is adapted to fit on the movable metal piece 20A and to extend between the solenoid 20 and the mounting arm 21. Instead of the stepping motor 5, a D.C. motor can be employed as a drive motor.

In assembling the magnetic disc recording and reproducing device according to the embodiment described above, in order to prevent mis-correspondency from occurring in the relationship between the displacing position of the magnetic head 4 and the rotating position of the pinion 8 and the stop member 10, the pinion 8 is mounted and fixed on the drive shaft 5A of the stepping motor 5 in such a manner that the stepping motor 5 is energized so that the magnetic head 4 is positioned on the "zero-track" and is prevented from moving from that position, with the pushing member 9 having just pushed on one end 14A of the arcuate toothed portion 14 in the direction of arrow D and the pinion 8 having just separated from the arcuate toothed portion 14. With thin spacers put between the stop member 10 and the stop 11, it is possible to make an adjustment to ensure that the magnetic head is reliably landed within the landing area 3B when the stop member 10 engages with the stop 11.

According to the present invention, as described in detail above, the magnetic head is automatically returned to a predetermined position on the magnetic disc. It is therefore possible to prevent the disc surface from being damaged by the magnetic head coming into contact with the same and to prevent the information recorded from disappearing when the rotation of the magnetic disc starts and stops. Further, the stepping motor is locked by the magnetic head returning member when the magnetic disc recording and reproducing device is in a non-operative state. Therefore, it is also possible to prevent the magnetic head from moving due to vibration and shock during transportation and hence from damaging the disc surface at such times.

What is claimed is:

1. A magnetic disc recording and reproducing device of the type having a magnetic head adapted to be floated above the disc surface of a magnetic disc in response to the rotation of the magnetic disc and to be displaced in the direction of the radius of the magnetic disc by a drive motor, said device comprising a magnetic head automatic returning means including:

a pinion fixedly mounted on a drive shaft of said drive motor for rotation through a predetermined angle in correspondence to the reciprocation of said magnetic head;

a magnetic head returning member rotatably disposed and adapted to assume a condition of disengagement from the pinion at the end of "return to zero" motion of the drive motor and to assume a condition of engagement with said pinion when the drive motor is stopped so as to forcibly rotate said pinion, thereby returning said magnetic head to a predetermined position;

a biasing spring for biasing said magnetic head returning member in the direction of tending to engage with said pinion; and a lock mechanism for holding said magnetic head returning member in the condition of being disengaged from said pinion against the spring force of said biasing spring at and after the end of the "return to zero" motion of said drive motor and for permitting said magnetic head returning member to rotate by virtue of the force of said spring when the drive motor is stopped.

* * * * *